(12) United States Patent
Huang

(10) Patent No.: US 9,589,521 B2
(45) Date of Patent: Mar. 7, 2017

(54) LIQUID CRYSTAL DISPLAY APPARATUS HAVING WIRE-ON-ARRAY STRUCTURE

(71) Applicant: Shenzhen China Star Optoelectronics Technology Co., Ltd., Guangdong (CN)

(72) Inventor: Shishuai Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 132 days.

(21) Appl. No.: 14/415,997

(22) PCT Filed: Dec. 3, 2014

(86) PCT No.: PCT/CN2014/092855
§ 371 (c)(1),
(2) Date: Jan. 20, 2015

(87) PCT Pub. No.: WO2016/078137
PCT Pub. Date: May 26, 2016

(65) Prior Publication Data
US 2016/0148588 A1     May 26, 2016

(30) Foreign Application Priority Data

Nov. 20, 2014  (CN) .......................... 2014 1 0665897

(51) Int. Cl.
*G09G 3/36* (2006.01)
*G02F 1/1368* (2006.01)
(Continued)

(52) U.S. Cl.
CPC ......... *G09G 3/3648* (2013.01); *G02F 1/1368* (2013.01); *G02F 1/13454* (2013.01);
(Continued)

(58) Field of Classification Search
CPC ......... G09G 3/3648; G09G 2310/0281; G09G 2300/0426; G02F 1/1368; G02F 1/13454; G02F 1/133514
See application file for complete search history.

(56) References Cited

U.S. PATENT DOCUMENTS

| | | | | |
|---|---|---|---|---|
| 5,670,994 A | * | 9/1997 | Kawaguchi | ......... G02F 1/13452 257/E23.065 |
| 6,005,652 A | * | 12/1999 | Matsuhira | ........... G02F 1/13452 349/149 |

(Continued)

FOREIGN PATENT DOCUMENTS

| | | |
|---|---|---|
| CN | 1877397 | 12/2006 |
| CN | 101075402 | 11/2007 |

(Continued)

*Primary Examiner* — Christopher E Leiby

(57) ABSTRACT

A liquid crystal display apparatus having a wire-on-array structure is disclosed. The liquid crystal display apparatus has a plurality of driving IC units, a plurality of first conductive-wire sets and second conductive-wire sets. The driving IC units are arranged at intervals in a peripheral circuit area around the active area of the liquid crystal display apparatus. The first conductive-wire sets and the second conductive-wire sets are connected alternately between every two of the plurality of driving IC units. Each first conductive-wire set has a conducting structure for connecting to a common electrode. The arrangement of the first conductive-wire sets and the second conductive-wire sets facilitates achievement of thin bezel design.

9 Claims, 4 Drawing Sheets

(51) Int. Cl.
  *G02F 1/1335* (2006.01)
  *G02F 1/1345* (2006.01)
(52) U.S. Cl.
  CPC .............. *G02F 1/133514* (2013.01); *G09G 2300/0426* (2013.01); *G09G 2310/0281* (2013.01)

(56) References Cited

U.S. PATENT DOCUMENTS

| | | | | |
|---|---|---|---|---|
| 6,424,400 | B1* | 7/2002 | Kawasaki | G02F 1/13452 349/149 |
| 7,002,812 | B2* | 2/2006 | Sakaki | H05K 1/147 349/149 |
| 7,224,353 | B2* | 5/2007 | Song | G02F 1/13452 345/103 |
| 7,286,202 | B2* | 10/2007 | Yamaguchi | G02F 1/13452 257/E23.062 |
| 7,349,054 | B2* | 3/2008 | Kohtaka | G02F 1/13452 174/257 |
| 7,379,148 | B2* | 5/2008 | Kim | G02F 1/13454 345/204 |
| 7,420,821 | B2* | 9/2008 | Sakaki | H05K 1/147 349/149 |
| 7,515,240 | B2* | 4/2009 | Lu | G02F 1/13452 349/149 |
| 7,705,812 | B2* | 4/2010 | Yuda | G02F 1/13452 345/206 |
| 7,714,974 | B2* | 5/2010 | Lee | G02F 1/1339 349/151 |
| 2001/0007413 | A1* | 7/2001 | Battersby | G09G 3/3233 315/169.3 |
| 2001/0015709 | A1* | 8/2001 | Imajo | G02F 1/13452 345/87 |
| 2002/0145696 | A1 | 10/2002 | Kim | |
| 2005/0018121 | A1* | 1/2005 | Jen | G02F 1/1345 349/151 |
| 2005/0156840 | A1* | 7/2005 | Kim | G09G 3/3655 345/87 |
| 2006/0055649 | A1 | 3/2006 | Yuda et al. | |
| 2007/0268212 | A1 | 11/2007 | Han et al. | |
| 2009/0164963 | A1* | 6/2009 | Zarkesh-Ha | G06F 17/5077 716/126 |
| 2010/0109994 | A1 | 5/2010 | Lee et al. | |
| 2011/0069432 | A1 | 3/2011 | Chang et al. | |
| 2011/0122052 | A1* | 5/2011 | Chen | G09G 3/3648 345/55 |
| 2012/0168762 | A1* | 7/2012 | Kikuchi | G02F 1/13452 257/59 |
| 2012/0257132 | A1* | 10/2012 | Kitajima | G02F 1/133512 349/42 |
| 2013/0088675 | A1* | 4/2013 | Ochiai | G02F 1/1339 349/123 |
| 2014/0022148 | A1* | 1/2014 | Kim | G09G 5/003 345/55 |
| 2014/0191930 | A1* | 7/2014 | Okumoto | G09G 3/006 345/55 |
| 2015/0062471 | A1* | 3/2015 | Sung | G09G 3/3655 349/33 |
| 2015/0262897 | A1* | 9/2015 | Chen | H01L 22/32 257/48 |
| 2016/0148562 | A1* | 5/2016 | Jung | G09G 3/3225 345/212 |
| 2016/0154287 | A1* | 6/2016 | Lee | G02F 1/1345 349/43 |

FOREIGN PATENT DOCUMENTS

| | | |
|---|---|---|
| CN | 101726896 | 6/2010 |
| CN | 102033340 | 4/2011 |

* cited by examiner

LIQUID CRYSTAL DISPLAY APPARATUS HAVING WIRE-ON-ARRAY STRUCTURE

RELATED APPLICATIONS

This application is a National Phase of PCT Patent Application No. PCT/CN2014/092855 having International filing date of Dec. 3, 2014, which claims the benefit of priority of Chinese Patent Application No. 201410665897.X filed on Nov. 20, 2014. The contents of the above applications are all incorporated by reference as if fully set forth herein in their entirety.

BACKGROUND OF THE INVENTION

Field of the Invention

The present invention relates to a liquid crystal display apparatus, and more particularly to a liquid crystal display apparatus having a wire-on-array structure.

Description of the Related Art

Liquid crystal display devices have several advantages such as compact size, light weight, low driving voltage, low power consumption and wide application range and have become the mainstream in the market of display devices. In order to manufacture lighter thin-film transistor liquid crystal display panels, the manufacturers have developed a Wire-On-Array (hereinafter "WOA") structure technology that mounts the conductive wires for the scanning drivers directly on the glass substrate of the liquid crystal panel for connecting to gate driving integrated circuits. With this technology, the use of printed circuit boards can be omitted so as to reduce the manufacturing costs of liquid crystal display devices.

With reference to FIG. 1, the foregoing WOA structure is substantially constructed by three types of conductive wires: 1. Common line (J) which provides a common-electrode voltage to a common electrode at a color-filter substrate side; 2. Conducting line (K) which provides driving voltages (such as gate driving voltage) to integrated circuits; and 3. Conducting line (L) which provides working signals (such as output enabling signals or clock pulse vertical signals) to the integrated circuits. The bezel width of a liquid crystal display panel is mainly decided by the width of the WOA structure, which is the width "d" in FIG. 1.

In the foregoing three types of conductive wires of the WOA structure, the conducting line K is required to have a certain low resistance so as to avoid affecting the rising and the amplitude of signals while the conducting line L can relatively have a higher resistance. Since the common line J which provides the common-electrode voltage must be connected to the common electrode of the color filter substrate on the opposite side through a conducting structure T, the width of the common line J has to match the width of the conducting structure T. In general, the width of the conducting structure T is about 900 micrometers, meaning that the line width of the common line J is required to be at least 900 micrometers, which may occupy one third of the width of the overall WOA structure. Since the conducting line K has to meet the minimum resistance requirement, the bezel width of the liquid crystal display panel cannot be narrowed by unlimitedly reducing the width of the conductive wires in the WOA structure.

Therefore, with the growing trend for thin bezel design, it is necessary to provide a liquid crystal display apparatus having a wire-on-array structure to overcome the problems existing in the conventional technology.

SUMMARY OF THE INVENTION

In view of the shortcomings of the conventional technologies, a main object of the present invention is to provide a liquid crystal display apparatus having a wire-on-array structure that is able to provide a narrower non-display area while comparing with the conventional technologies so that the bezel width of the liquid crystal apparatus can be reduced even more.

In order to achieve the foregoing object, the present invention provides a liquid crystal display apparatus having an active area; a peripheral circuit area surrounding the active area; a plurality of driving IC units being arranged at intervals at at least one side of the peripheral circuit area; and a plurality of first conductive-wire sets and second conductive-wire sets being connected alternately between every two of the plurality of driving IC units, wherein each of the first conductive-wire sets has a conducting structure for connecting to a common electrode.

In one embodiment of the present invention, the liquid crystal display apparatus further includes a thin-film transistor array substrate and a color-filter substrate which are mounted opposite to each other; the driving IC unit is mounted on thin-film transistor array substrate; and the common electrode is mounted on the color-filter substrate.

In one embodiment of the present invention, each of the first conductive-wire sets and the second conductive-wire sets includes an A-type conductive wire, a B-type conductive wire and a C-type conducting wire; a ratio of the width of the A-type conductive wire of the first conductive-wire set to the width of the A-type conductive wire of the second conductive-wire set is ranged from 1 to 1.5; a ratio of the width of the B-type conductive wire of the first conductive-wire set to the width of the B-type conductive wire of the second conductive-wire set is 1; a ratio of the width of the C-type conductive wire of the first conductive-wire set to the width of the C-type conductive wire of the second conductive-wire set is ranged from 2/3 to 1.

In one embodiment of the present invention, the ratio of the width of the A-type conductive wire of the first conductive-wire set to the width of the A-type conductive wire of the second conductive-wire set is 3/2; the ratio of the width of the B-type conductive wire of the first conductive-wire set to the width of the B-type conductive wire of the second conductive-wire set is 1; the ratio of the width of the C-type conductive wire of the first conductive-wire set to the width of the C-type conductive wire of the second conductive-wire set is 2/3.

In one embodiment of the present invention, each of the first conductive-wire sets and the second conductive-wire sets includes an A-type conductive wire, a B-type conductive wire and a C-type conducting wire; a ratio of the width of the A-type conductive wire of the first conductive-wire set to the width of the A-type conductive wire of the second conductive-wire set is ranged from 1 to 2; a ratio of the width of the B-type conductive wire of the first conductive-wire set to the width of the B-type conductive wire of the second conductive-wire set is ranged from 0.25 to 1; a ratio of the width of the C-type conductive wire of the first conductive-wire set to the width of the C-type conductive wire of the second conductive-wire set is ranged from 0.25 to 1.

In one embodiment of the present invention, the ratio of the width of the A-type conductive wire of the first conductive-wire set to the width of the A-type conductive wire of the second conductive-wire set is 2; the ratio of the width of the B-type conductive wire of the first conductive-wire set to the width of the B-type conductive wire of the second conductive-wire set is 0.25; the ratio of the width of the C-type conductive wire of the first conductive-wire set to the width of the C-type conductive wire of the second conductive-wire set is 0.25.

In one embodiment of the present invention, the A-type conductive is used to transmit a reference voltage to the common electrode; the B-type conductive wire is used to transmit a switching voltage from the driving IC units; the C-type conductive wire is used to transmit a timing signal from the corresponding driving IC unit.

In one embodiment of the present invention, thin-film transistor array substrate is provided with a plurality of scanning lines and data lines and a plurality of thin-film transistors arranged in an array, wherein each of the thin-film transistors is connected to a pixel electrode, and the pixel electrode forms a storage capacitor with a corresponding common line and forms a liquid crystal capacitor with the common electrode mounted on the color-filter substrate.

In one embodiment of the present invention, the conducting structure is electrically-conductive adhesive.

The present invention further provides a liquid crystal display apparatus includes: an active area; a peripheral circuit area surrounding the active area; a plurality of driving IC units being arranged at intervals at at least one side of the peripheral circuit area; and a plurality of first conductive-wire sets and second conductive-wire sets being connected alternately between every two of the driving IC units, wherein each of the first conductive-wire sets is provided with a conducting structure for connecting to a common electrode; wherein each of the first conductive-wire sets and the second conductive-wire sets includes an A-type conductive wire, a B-type conductive wire and a C-type conducting wire; wherein the A-type conductive is used to transmit a reference voltage to the common electrode; the B-type conductive wire is used to transmit a switching voltage from the driving IC units; the C-type conductive wire is used to transmit a timing signal from the corresponding driving IC unit; a ratio of the width of the A-type conductive wire of the first conductive-wire set to the width of the A-type conductive wire of the second conductive-wire set is 3/2; a ratio of the width of the B-type conductive wire of the first conductive-wire set to the width of the B-type conductive wire of the second conductive-wire set is 1; a ratio of the width of the C-type conductive wire of the first conductive-wire set to the width of the C-type conductive wire of the second conductive-wire set is 2/3.

The present invention is mainly to utilize two kinds of conductive-wire sets which include conductive wires with specific line width to construct a WOA structure by arranging them alternately between every two driving IC units. Such structure is able to facilitate a reduction in the overall width of peripheral circuit wires of a liquid crystal display panel so that the non-active area of the liquid crystal display panel can be reduced more.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
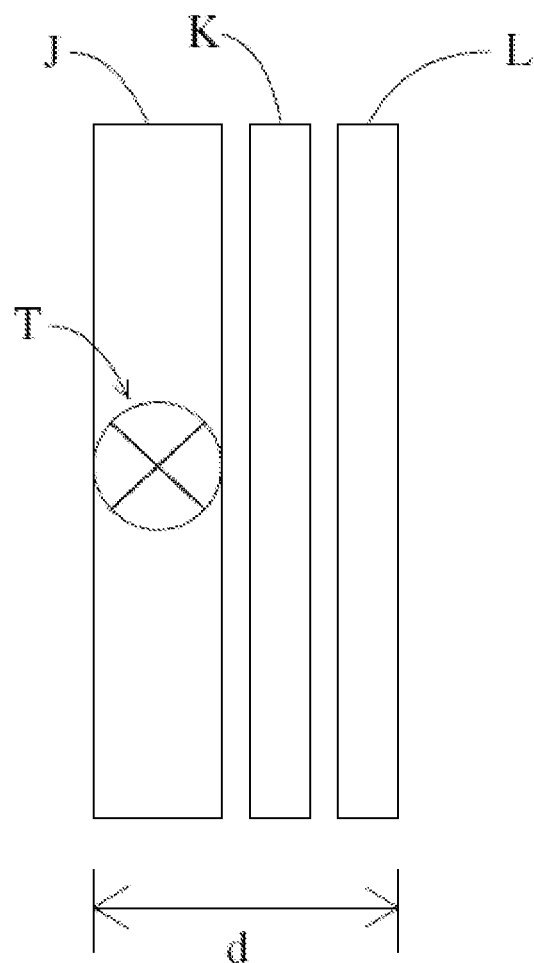
FIG. 1 is a schematic diagram showing the composition of a conventional WOA structure.
Figure 2:
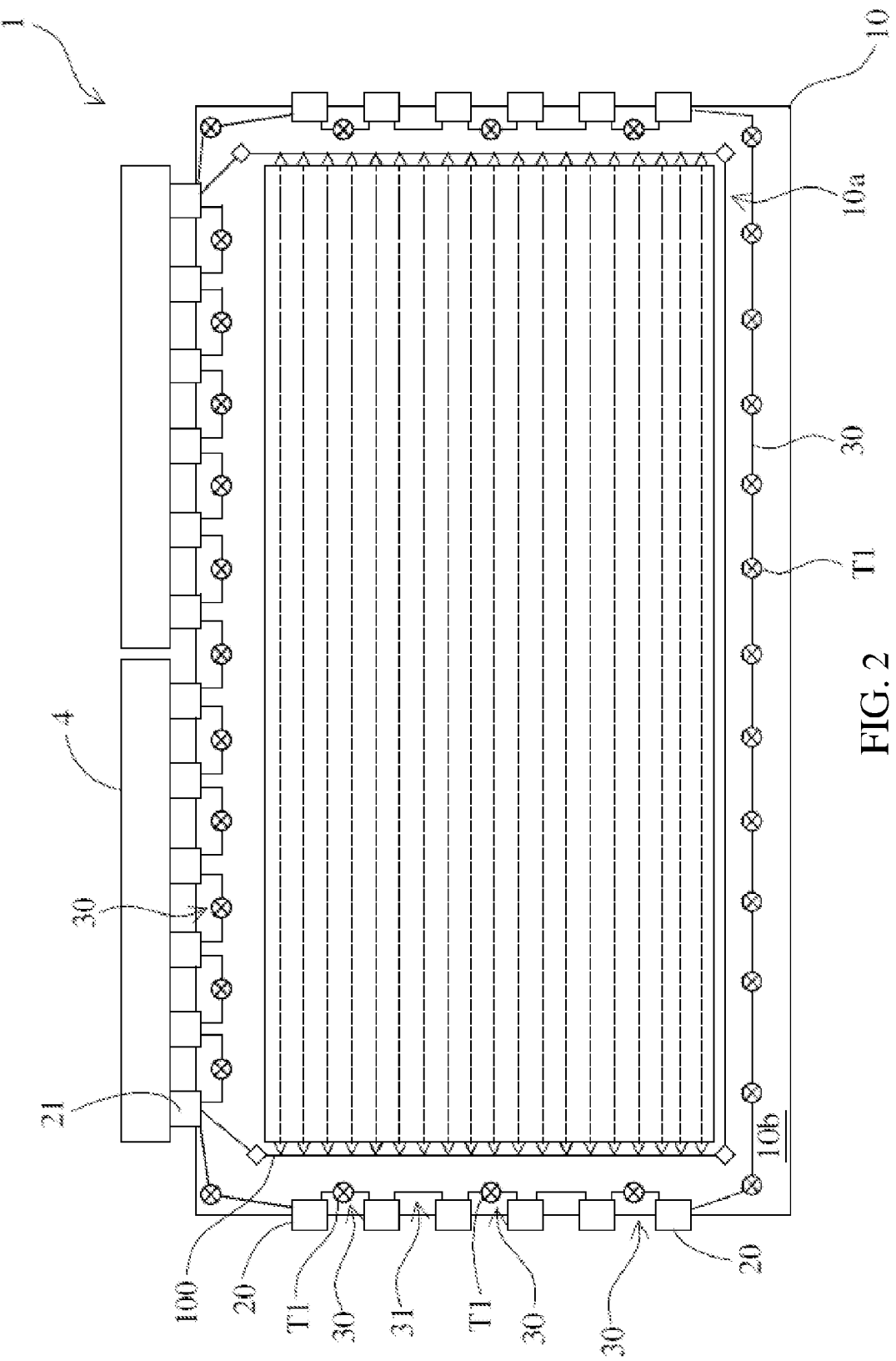
FIG. 2 is a schematic diagram of a liquid crystal display apparatus having a WOA structure according to a preferred embodiment of the present invention.

With reference to FIG. 2, FIG. 2 is a schematic diagram of a liquid crystal display apparatus having a WOA structure according to a preferred embodiment of the present invention. The liquid crystal display apparatus 1 is mainly constructed by a first substrate 10, a second substrate (not shown) and a liquid crystal layer disposed between both of the substrates. The first substrate 10 and the second substrate are mounted opposite to each other and may be a thin-film transistor array substrate and a color-filter substrate, respectively.

The first substrate 10, as a thin-film transistor array substrate, may have an active area 10a (also called "display area") and a peripheral circuit area 10b (also called "non-display area") surrounding the active area 10a, wherein the active area 10a is provided with a plurality of scanning lines, data lines, common lines and a plurality of thin-film transistors arranged in an array. Each of the thin-film transistors is connected to a corresponding pixel electrode. The pixel electrode forms a storage capacitor with a corresponding common line. The scanning lines, the data lines, the thin-film transistors and the pixel electrodes on the first substrate 10 form a pixel array. The pixel array includes a plurality of pixel units, each pixel unit includes one thin-film transistor and one pixel electrode that is connected to the thin-film transistor, and each pixel unit is bounded by two adjacent scanning lines and two adjacent data lines.

The second substrate (not shown), as a traditional color-filter substrate, may be provided with a color filter layer constructed by red, green and blue photoresist and a common electrode. The pixel electrode on the first substrate 10 forms a liquid crystal capacitor with the common electrode during its work time so as to control the twisting of liquid crystal molecules.

As shown in FIG. 2, the first substrate 10 is provided with a plurality of driving IC units 20, 21 and a plurality of first conductive-wire sets 30 and second conductive-wire sets 31 in the peripheral circuit area 10b. In this embodiment, the driving IC units 20, 21 are arranged at intervals at at least one side of the peripheral circuit area 10b. Generally speaking, the driving IC units 20, 21 may be directly bonded on the thin-film transistor array substrate by using a Chip-on-Glass technology. Based on the arrangement of the scanning lines (gate lines) and data lines of the pixel array, the peripheral circuit area 10b at different sides thereof may at least include a gate driving circuit bonding area and a data driving circuit bonding area. The driving IC units 20, 21 then are arranged in these bonding areas. For example, in this embodiment, a part of the driving IC units 20 are arranged in the gate driving circuit bonding area at one side of the active area 10*a*, another part of the driving IC units 21 are arranged in the data driving circuit bonding area at another side of the active area 10*a*.

As shown in FIG. 2, the first conductive-wire sets 30 and the second conductive-wire sets 31 are also mounted in the peripheral circuit area 10*b* of the first substrate 10 (thin-film transistor array substrate) and located at one side of the peripheral circuit area 10*b*. The first conductive-wire sets 30 and the second conductive-wire sets 31 are connected between every two of the driving IC units 20.

Figure 4:
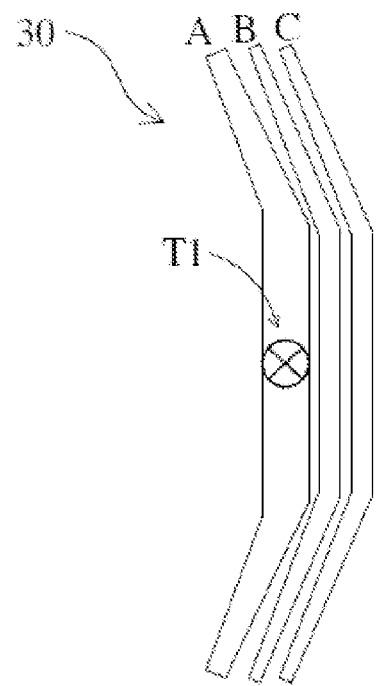
FIG. 4 is a schematic diagram showing the composition of a first conductive-wire set of the WOA structure of the present invention.
Figure 5:
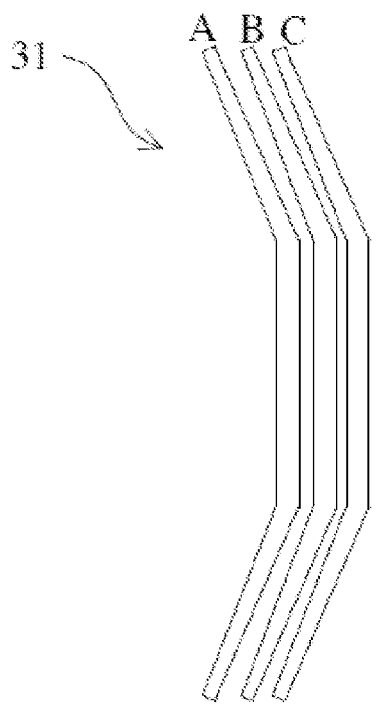
FIG. 5 is a schematic diagram showing the composition of a second conductive-wire set of the WOA structure of the present invention.

With further reference to FIGS. 4 and 5, in this embodiment, each of the first conductive-wire sets 30 and the second conductive-wire sets 31 includes an A-type conductive wire, a B-type conductive wire and a C-type conducting wire, wherein the A-type conductive is mainly used to transmit a reference voltage to the common electrode; the C-type conductive wire is mainly used to transmit a timing signal from the corresponding driving IC unit 20; and the B-type conductive wire is mainly used to transmit a switching voltage from the driving IC units 20 thus is required to have a relatively lower resistance than other conductive wires.

The difference between the first conductive-wire set 30 and the second conductive-wire set 31 is that the first conductive-wire set 30 further has a conducting structure T1 for connecting to the common electrode on the second substrate (the color-filter substrate) through the conducting structure T1. The conducting structure T1 may be electrically-conductive adhesive or other similar electrically-conductive materials. Furthermore, the first conductive-wire set 30 and the second conductive-wire set 31 are also different in wire width. For example, in this embodiment, a ratio of the width of the A-type conductive wire of the first conductive-wire set 30 to the width of the A-type conductive wire of the second conductive-wire set 31 is ranged from 1 to 1.5; a ratio of the width of the B-type conductive wire of the first conductive-wire set 30 to the width of the B-type conductive wire of the second conductive-wire set 31 is 1; a ratio of the width of the C-type conductive wire of the first conductive-wire set 30 to the width of the C-type conductive wire of the second conductive-wire set 31 is ranged from 2/3 to 1. The ratio of the width of the A-type conductive wire of the first conductive-wire sets 30 to the width of the A-type conductive wire of the second conductive-wire sets 31 is preferably 3/2, meaning that the width of the A-type conductive wire of the first conductive-wire sets 30 is one half more than the width of the A-type conductive wire of the second conductive-wire sets 31. The ratio of the width of the B-type conductive wire of the first conductive-wire sets 30 to the width of the B-type conductive wire of the second conductive-wire sets 31 is preferably 1, meaning that both of them have the same width. The ratio of the width of the C-type conductive wire of the first conductive-wire set to the width of the C-type conductive wire of the second conductive-wire set is preferably 2/3, meaning that the width of the C-type conductive wire of the first conductive-wire sets 30 is one third less than the width of the C-type conductive wire of the second conductive-wire sets 31. With the foregoing width configuration of the conductive wires, the WOA structure constructed by the first conductive-wire sets 30 and the second conductive-wire sets 31 can have a reduction in overall wire width by one third while assuring that the resistance of the B-type conductive wire is kept constant, thus avoiding affecting the rising and the amplitude of signals transmitted through the B-type conductive wire. Therefore, such WOA structure formed by the first conductive-wire sets 30 and the second conductive-wire sets 31 can effectively help shrinking the range of the peripheral circuit area 10*b* without affecting its own electrical characteristics.

In another embodiment, the ratio of the width of the A-type conductive wire of the first conductive-wire set 30 to the width of the A-type conductive wire of the second conductive-wire set 31 may be ranged from 1 to 2; the ratio of the width of the B-type conductive wire of the first conductive-wire set 30 to the width of the B-type conductive wire of the second conductive-wire set 31 may be ranged from 0.25 to 1; the ratio of the width of the C-type conductive wire of the first conductive-wire set 30 to the width of the C-type conductive wire 31 of the second conductive-wire set 31 may be ranged from 0.25 to 1. In more details, the ratio of the width of the A-type conductive wire of the first conductive-wire set 30 to the width of the A-type conductive wire of the second conductive-wire set 31 is preferably 2; the ratio of the width of the B-type conductive wire of the first conductive-wire set 30 to the width of the B-type conductive wire of the second conductive-wire set 31 is preferably 0.25; the ratio of the width of the C-type conductive wire 30 of the first conductive-wire set to the width of the C-type conductive wire of the second conductive-wire set 31 is preferably 0.25. With the foregoing width configuration of the conductive wires, the WOA structure constructed by the first conductive-wire sets 30 and the second conductive-wire sets 31 can have a reduction in total width by one third while assuring that the resistances of the B-type conductive wire and the C-type conductive wire of the WOA structure are kept constant, and therefore, the range of the peripheral circuit area 10*b* can be effectively shrunk without affecting the electrical characteristics of the B-type conductive wire.

Figure 3:
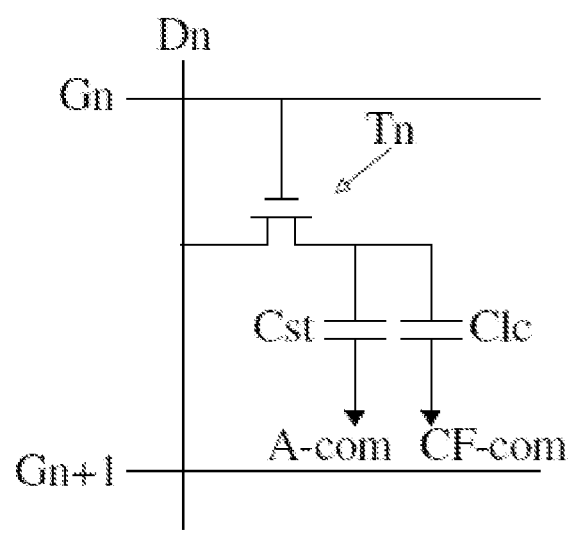
FIG. 3 is an equivalent circuit diagram of each pixel unit of a liquid crystal display apparatus.

With reference to both of FIG. 2 and FIG. 3, when the liquid crystal display apparatus 1 is at a normal display status, a pixel-electrode signal is provided through the data line Dn when the thin-film transistor Tn is switched on. A storage electrode signal is provided via a peripheral common line 100 outside the active area 10*a* to an array common line A-com (as shown in FIG. 2) which is connected to the peripheral common line 100. The array common line A-com then forms a storage capacitor Cst with the corresponding pixel electrode (not shown). The reference voltage for the common electrode (not shown) on the color-filter substrate (that is, the second substrate) then is provided by the A-type conductive wire of the first conductive-wire sets 30 (acting as the common line CF-com in FIG. 3) via the conducting structure T1. A liquid crystal capacitor Clc then is formed between the common electrode on the color-filter substrate and the corresponding pixel electrode.

From the above description it will be seen that the present invention, in comparison with the conventional technology, utilizes two kinds of conductive-wire sets having conductive wires with specific line width to construct a WOA structure by arranging them alternately between every two driving IC units. Such structure is able to facilitate a reduction in the overall width of peripheral circuit wires of a liquid crystal display panel so that the non-active area of the liquid crystal display panel can be reduced more.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A liquid crystal display apparatus comprising:
    an active area;
    a peripheral circuit area surrounding the active area;
    a plurality of driving IC units being arranged at intervals at at least one side of the peripheral circuit area; and
    a plurality of first conductive-wire sets and second conductive-wire sets being connected alternately between every two of the driving IC units, wherein each of the first conductive-wire sets is provided with a conducting structure for connecting to a common electrode; wherein each of the first conductive-wire sets and the second conductive-wire sets includes an A-type conductive wire, a B-type conductive wire and a C-type conducting wire; wherein the A-type conductive is used to transmit a reference voltage to the common electrode; the B-type conductive wire is used to transmit a switching voltage from the driving IC units; the C-type conductive wire is used to transmit a timing signal from the corresponding driving IC unit; a ratio of the width of the A-type conductive wire of the first conductive-wire set to the width of the A-type conductive wire of the second conductive-wire set is 3/2; a ratio of the width of the B-type conductive wire of the first conductive-wire set to the width of the B-type conductive wire of the second conductive-wire set is 1; a ratio of the width of the C-type conductive wire of the first conductive-wire set to the width of the C-type conductive wire of the second conductive-wire set is 2/3.

2. The liquid crystal display apparatus as claimed in claim 1, wherein the liquid crystal display apparatus further includes a thin-film transistor array substrate and a color-filter substrate which are mounted opposite to each other; the driving IC unit is mounted on thin-film transistor array substrate; and the common electrode is mounted on the color-filter substrate.

3. The liquid crystal display apparatus as claimed in claim 2, wherein the thin-film transistor array substrate is provided with a plurality of scanning lines and data lines and a plurality of thin-film transistors arranged in an array, wherein each of the thin-film transistors is connected to a pixel electrode, and the pixel electrode forms a storage capacitor with a corresponding common line and forms a liquid crystal capacitor with the common electrode mounted on the color-filter substrate.

4. The liquid crystal display apparatus as claimed in claim 2, wherein the conducting structure is electrically-conductive adhesive.

5. A liquid crystal display apparatus comprising:
    an active area;
    a peripheral circuit area surrounding the active area;
    a plurality of driving IC units being arranged at intervals at at least one side of the peripheral circuit area; and
    a plurality of first conductive-wire sets and second conductive-wire sets being connected alternately between every two of the driving IC units, wherein each of the first conductive-wire sets is provided with a conducting structure for connecting to a common electrode; wherein each of the first conductive-wire sets and the second conductive-wire sets includes an A-type conductive wire, a B-type conductive wire and a C-type conducting wire; a ratio of the width of the A-type conductive wire of the first conductive-wire set to the width of the A-type conductive wire of the second conductive-wire set is ranged from 1 to 2; a ratio of the width of the B-type conductive wire of the first conductive-wire set to the width of the B-type conductive wire of the second conductive-wire set is ranged from 0.25 to 1; a ratio of the width of the C-type conductive wire of the first conductive-wire set to the width of the C-type conductive wire of the second conductive-wire set is ranged from 0.25 to 1; wherein the ratio of the width of the A-type conductive wire of the first conductive-wire set to the width of the A-type conductive wire of the second conductive-wire set is 2; the ratio of the width of the B-type conductive wire of the first conductive-wire set to the width of the B-type conductive wire of the second conductive-wire set is 0.25; the ratio of the width of the C-type conductive wire of the first conductive-wire set to the width of the C-type conductive wire of the second conductive-wire set is 0.25.

6. The liquid crystal display apparatus as claimed in claim 5, wherein the liquid crystal display apparatus further includes a thin-film transistor array substrate and a color-filter substrate which are mounted opposite to each other; the driving IC unit is mounted on thin-film transistor array substrate; and the common electrode is mounted on the color-filter substrate.

7. The liquid crystal display apparatus as claimed in claim 5, wherein the A-type conductive is used to transmit a reference voltage to the common electrode; the B-type conductive wire is used to transmit a switching voltage from the driving IC units; the C-type conductive wire is used to transmit a timing signal from the corresponding driving IC unit.

8. The liquid crystal display apparatus as claimed in claim 6, wherein thin-film transistor array substrate is provided with a plurality of scanning lines and data lines and a plurality of thin-film transistors arranged in an array, wherein each of the thin-film transistors is connected to a pixel electrode, and the pixel electrode forms a storage capacitor with a corresponding common line and forms a liquid crystal capacitor with the common electrode mounted on the color-filter substrate.

9. The liquid crystal display apparatus as claimed in claim 6, wherein the conducting structure is electrically-conductive adhesive.

* * * * *